United States Patent
Donovan et al.

(10) Patent No.: US 9,230,432 B2
(45) Date of Patent: Jan. 5, 2016

(54) SYSTEM AND METHOD FOR DETERMINING ARTERIAL ROADWAY THROUGHPUT

(75) Inventors: Steve Donovan, Milton, GA (US); Christian Kotscher, Cumming, GA (US); Andrew Edwin Brimer, Cumming, GA (US)

(73) Assignee: MetroTech Net, Inc., Alpharella, GA (US)

( * ) Notice: Subject to any disclaimer, the term of this patent is extended or adjusted under 35 U.S.C. 154(b) by 0 days.

(21) Appl. No.: 14/241,697

(22) PCT Filed: Aug. 31, 2012

(86) PCT No.: PCT/US2012/053387
§ 371 (c)(1),
(2), (4) Date: Jun. 16, 2014

(87) PCT Pub. No.: WO2013/033560
PCT Pub. Date: Mar. 7, 2013

(65) Prior Publication Data
US 2014/0288810 A1 Sep. 25, 2014

Related U.S. Application Data

(60) Provisional application No. 61/529,846, filed on Aug. 31, 2011.

(51) Int. Cl.
G06F 19/00 (2011.01)
G08G 1/01 (2006.01)
G01C 21/36 (2006.01)

(52) U.S. Cl.
CPC .......... *G08G 1/0116* (2013.01); *G01C 21/3691* (2013.01)

(58) Field of Classification Search
CPC ...... G06Q 40/08; G06Q 40/02; G01S 17/023; G01S 19/17; G01S 19/34
USPC ............ 701/36, 117, 118, 423, 454; 340/642, 340/905, 906, 907, 909, 910, 913, 914, 915, 340/916, 917, 931, 933, 934, 936, 937, 943, 340/988, 989, 990, 995.19; 342/457; 348/148, 149; 382/104; 246/473.1
See application file for complete search history.

(56) References Cited

U.S. PATENT DOCUMENTS

| | | | | |
|---|---|---|---|---|
| 4,350,970 | A * | 9/1982 | von Tomkewitsch | 340/989 |
| 4,775,865 | A * | 10/1988 | Smith et al. | 340/906 |
| 5,296,852 | A * | 3/1994 | Rathi | 340/933 |
| 5,444,442 | A * | 8/1995 | Sadakata et al. | 340/916 |
| 6,204,778 | B1 * | 3/2001 | Bergan et al. | 340/936 |
| 7,248,149 | B2 * | 7/2007 | Bachelder et al. | 340/425.5 |
| 7,986,339 | B2 * | 7/2011 | Higgins | 348/149 |
| 8,666,643 | B2 * | 3/2014 | McBride et al. | 701/117 |
| 2005/0015269 | A1 | 1/2005 | Polizzoto | |
| 2005/0122235 | A1 | 6/2005 | Teffer et al. | |
| 2007/0096943 | A1 | 5/2007 | Arnold et al. | |

(Continued)

OTHER PUBLICATIONS

International Search Report for PCT/US2012/053387 dated Nov. 16, 2012, 2 pages.

*Primary Examiner* — Marc McDieunel
(74) *Attorney, Agent, or Firm* — Lowenstein Sandler LLP

(57) ABSTRACT

Systems and methods for calculating the health of an intersection, including lane-level impacts, using traffic data obtained from the intersection.

33 Claims, 3 Drawing Sheets

(56) References Cited

U.S. PATENT DOCUMENTS

2007/0216521 A1 9/2007 Guensler et al.
2008/0015772 A1* 1/2008 Sanma et al. ............... 701/207
2011/0106592 A1 5/2011 Stehle et al.

* cited by examiner

SYSTEM AND METHOD FOR DETERMINING ARTERIAL ROADWAY THROUGHPUT

This application claims priority to U.S. Provisional Application No. 61/529,846 filed Aug. 31, 2011, the disclosure of which is hereby incorporated by reference in its entirety.

BACKGROUND OF THE INVENTION

It has been reported that the average urban commuter spends roughly thirty six hours per year in traffic jams. This figure corresponds to the average American work week. Therefore, the economic impact of such wasted time is in the billions of dollars each year. While harder to quantify, the social and emotional toll of traffic jams are also significant.

Various systems have been developed in an effort to ease traffic congestion and reduce time wasted in traffic jams. One such system involves measuring traffic speed along a given route to calculate an estimated travel time. Real-time data regarding travel time can then be overlaid on a map to create a visual indicator of which roadways are moving the fastest. However, this method provides a relatively inaccurate estimate for several reasons. Travel time between two points is a calculation of when a global positioning system (or other location device) indication identifies the spatiotemporal status of a vehicle, or probe, and compares it to a subsequent spatiotemporal measurement. Travel time between the two spatial (location) points is then estimated. Due to the nature of probe estimations, the route could have been compromised by a stop made by the probe vehicle or a detour on a similar route to avoid an incident resulting in a false report of travel time along the assumed route.

Further, while immediate reporting of a GPS-tracked probe vehicle's speed can be helpful to determine the traffic flow on a particular segment, it cannot be used to measure traffic volume—a key determinate of how well an arterial road is performing. If the tracked vehicle pulls to the side of the road, or stops to pick up dry cleaning on the way home, the probe system may mistake it for an incident if no other probes are flowing past that area at that moment.

Therefore, a need exists in the art for a system capable of accurately measuring both vehicle speed and traffic volume, in order to accurately calculate not only travel time along a given segment of road, but also the general health of the assumed route as well. To satisfy this need for volume, the intersections along the routes will be used. A system that properly measures the health of a network of intersections; through both speed and volume can more accurately determine the impact on the route between them.

OBJECTS AND SUMMARY OF THE INVENTION

It is therefore an object of the present invention to provide a system and method for calculating the health of an intersection using traffic data obtained from the intersection.

It is also an object of the present invention to provide a system and method for providing navigation assistance using traffic data obtained from an intersection.

It is a further object of the present invention to provide a system and method for providing traffic safety alerts using traffic data obtained from an intersection.

It is yet a further object of the present invention to provide a system and method for providing intersection planning data using traffic data obtained from an intersection.

It is also an object of the present invention to provide a system and method for providing land value data for an area of land around or near an intersection using traffic data obtained from the intersection.

Therefore, in certain embodiments, the present invention is directed to a system for calculating health of an intersection comprising: (i) a detector configured to obtain traffic data relating to an intersection; (ii) a processor communicatively connected to the detector; and (iii) a storage device communicatively connected to the processor, wherein the storage device stores the traffic data obtained from the detector, and wherein the processor executes computerized instructions to calculate the health of the intersection using the traffic data.

In certain embodiments, the present invention is directed to a method for calculating the health of an intersection comprising: (i) receiving traffic data relating to an intersection from a detector; (ii) storing the traffic data in a storage unit; and (iii) calculating, through a computer, the health of the intersection using the traffic data.

In certain other embodiments, the present invention is directed to a method for providing traffic navigation assistance comprising: (i) receiving traffic data relating to an intersection from a detector; (ii) storing the traffic data in a storage unit; (iii) calculating, through a computer, the health of the intersection using the traffic data; (iv) determining route options for a vehicle based on the calculated health of the intersection; and (v) transmitting the route options to a receiving unit.

In other embodiments, the present invention is directed to a method for providing traffic safety alerts comprising: (i) receiving traffic data relating to an intersection from a detector; (ii) storing the traffic data in a storage unit; (iii) calculating, through a computer, the health of the intersection using the traffic data; (iv) determining if the calculations of the health of the intersection meet or exceed a pre-determined safety alert level; and (v) responsive to determining that the calculations of the health of the intersection meet or exceed the pre-determined safety alert level, transmitting a safety alert to a receiving unit.

In certain other embodiments, the present invention is directed to a method for providing intersection planning data comprising: (i) receiving traffic data relating to an intersection from a detector; (ii) storing the traffic data in a storage unit; (iii) calculating, through a computer, the health of the intersection using the traffic data; (iv) determining if the calculations of the health of the intersection fall below, meet or exceed a pre-determined level of service for the intersection; and (v) responsive to determining that the calculations of the health of the intersection fall below, meet or exceed the pre-determined level, taking an action on the planning of the intersection.

In yet other embodiments, the present invention is directed to a method for providing land value data comprising: (i) receiving traffic data relating to an intersection from a detector; (ii) storing the traffic data in a storage unit; (iii) calculating, through a computer, the health of the intersection using the traffic data; (iv) analyzing the calculated health of the intersection; and (v) using the analysis to determine land value of an area around the intersection.

In certain other embodiments, the present invention is further directed to a method of determining the impact the health of one intersection has on the health of another intersection using the systems described herein.

In yet other embodiments, the present invention is directed to a method of determining the lane-level impact the health of the one intersection has on the health of another intersection using the systems described herein.

For purposes of this disclosure, terms are to be given their plain and ordinary meaning in the context in which they arise as understood by those possessing ordinary skill in the art unless otherwise stated herein.

As used herein, when referring to a "first" or "initial" intersection, in relation to a "second" or "another" intersection, the "second" or "another" intersection is not intended to be limited only to the intersection immediately adjacent to the "first" or "initial" intersection. For example, any number of intersections may be present in the route between a "first" or "initial" intersection, in relation to a "second" or "another" intersection.

As used herein, the term "communicatively connected" is intended to include any type of connection, whether wired or wireless, in which data may be communicated and also includes a connection between devices and/or programs within a single computer or between devices and/or programs on separate computers.

As used herein, the term "computer" is intended to include any data processing device, such as a desktop computer, a laptop computer, a tablet computer, a mainframe computer, a personal digital assistant, a server, or any other device able to process, manage or transmit data, whether implemented with electrical, magnetic, optical, biological components or otherwise.

The term "module" is intended to include, but is not limited to, one or more computers configured to execute one or more software programs configured to perform one or more functions, operations, and/or actions.

DETAILED DESCRIPTION OF THE INVENTION

Figure 1:
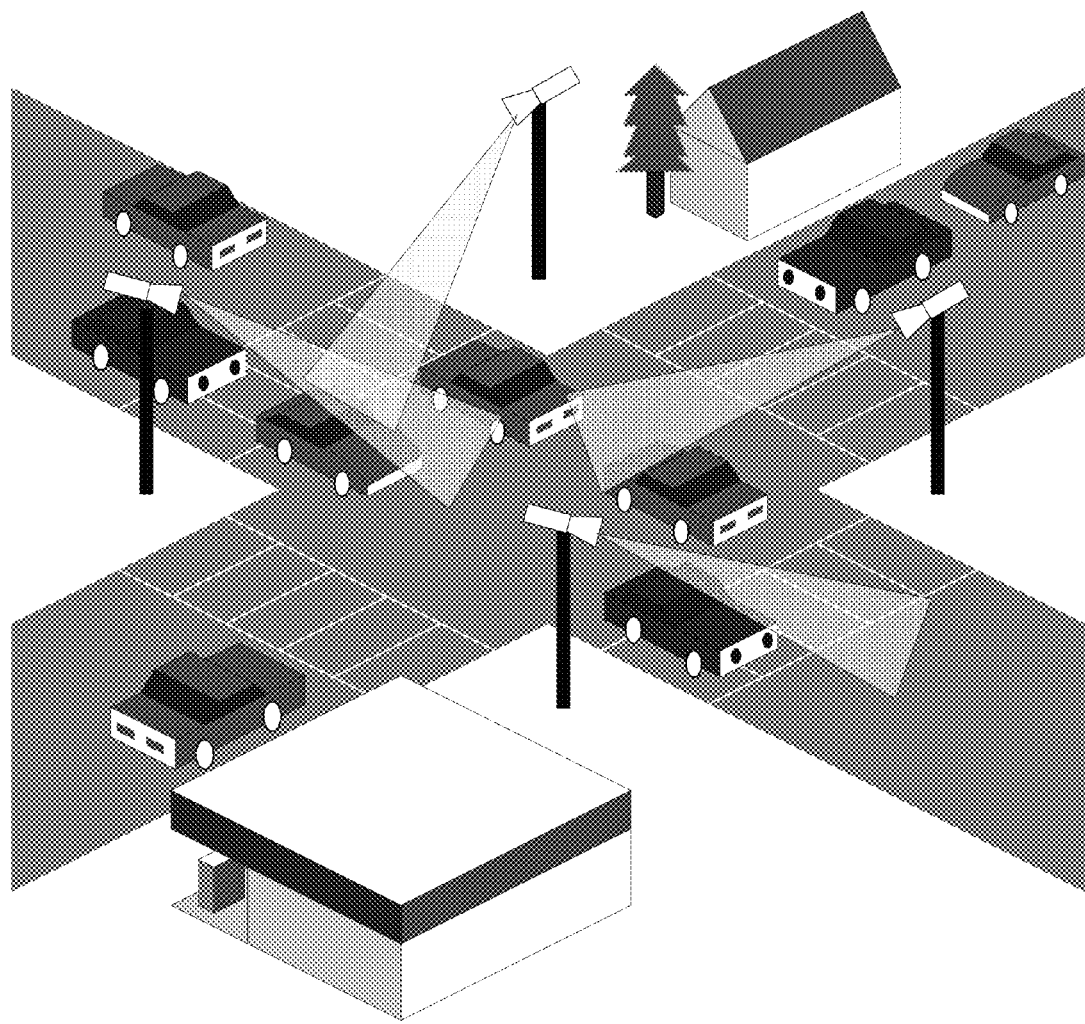
FIG. 1 depicts an exemplary intersection with detectors according to an embodiment of the invention.

The systems of the present invention include (i) a detector configured to obtain traffic data from, or relating to, an intersection; (ii) a processing machine, or "processor", communicatively coupled to the detector; and (iii) a storage device communicatively connected to the processor.

The detectors in the systems of the present invention include, e.g., inductive loops, video image processors, microwave sensors, infrared sensors, magnetic sensors, radio frequency tags, ultrasonic sensors, global positioning system, and the like. Preferably, the detectors are configured to obtain "real-time" traffic data from, or relating to, the intersection. As used herein, "real-time" means within at least about 5 minutes, within at least about 1 minute, within at least about 30 seconds, within at least about 10 seconds, within at least about 5 seconds, within at least about 2 seconds, within at least about 1 second, within at least about 0.5 seconds, within at least about 0.005 seconds, within at least about 0.001 seconds of the occurrence of an event. Thus, the use of pixel speed analytics and video is advantageous because it allows for a much higher sampling rate of motor vehicles entering and leaving the intersection, and allows for the measurement of "real-time" traffic data.

As used herein, the term "processing machine" or "processor" means a tangibly embodied machine, such as a general purpose computer or a special purpose computer, for example. The term "processing machine" is to be understood to include at least one processor that uses at least one memory. As used herein, the terms "memory" and "storage device" are used interchangeably. The memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows® 7 operating system, Microsoft Windows® Vista® operating system, the Microsoft Windows®XP® operating system, the Microsoft Windows® NT® operating system, the Windows® 2000 operating system, the Unix operating system, the Linux operating system, the Xenix operating system, the IBM AIX® operating system, the Hewlett-Packard UX® operating system, the Novell Netware® operating system, the Sun Microsystems Solaris® operating system, the OS/2® operating system, the BeOS® operating system, the Macintosh operating system, the Apache operating system, an OpenStep® operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, which enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

The systems of the present invention, as described above, are configured to calculate the health of an intersection, which can then be used for a variety of purposes, as described in greater detail herein. In accordance with the present invention, the health of an intersection is calculated using traffic data from, or relating to, the intersection of interest. Traffic data may include variables such as, e.g., traffic volume, traffic speed, traffic location, time of day, traffic direction, location of the intersection and any combination thereof.

For the purposes of the present invention, traffic volume is the number of motor vehicles which pass through a lane, road or intersection at any given time period. For example, the periods of time used to determine volume may be based on light cycle of a traffic light, every 5 minutes, every 10 minutes, every 15 minutes, every hour, every 6 hours, every 12 hours, every 24 hours, etc.

For the purposes of the present invention, traffic speed can include both the average speed and maximum speed of motor vehicles. Average speed may be calculated as the combined average speed of the motor vehicles entering an intersection at a given time period. Maximum speed may be calculated as the maximum speed any one (or more) motor vehicle obtained at a given time period.

For purposes of the present invention, location of the intersection may include data relating to where the intersection is located, such as country, region, state, metro area, county, neighborhoods, cities, streets, latitude/longitude or any combination thereof.

For purposes of the present invention, traffic location may include data relating to the location of a motor vehicle within the intersection (e.g., the distance of a vehicle to the actual intersection), the lane-level location of the vehicle, including, e.g., whether the vehicle is in a passing lane, designated turning lane, off on the shoulder of the lane, etc.

Traffic data may also include a measurement called pacing. Pacing is the distance between two motor vehicles at the same traffic location which can be measured by both distance and time, or a combination of both. For example, the average pacing of an intersection is the average time between motor vehicles in motion during a given time period. Maximum pacing is the pacing time achieved by any one (or more) motor vehicle(s) in motion before the motor vehicle(s) reduces speed.

Any of the traffic data variables may be assigned a particular weight in order to tailor the calculation of the health of the intersection to suit the particular use or particular location. For example, in embodiments where the system is obtaining data from a main road, it may be best to weigh volume and throughput more heavily, whereas when obtaining data from a side road, pacing may be weighed more heavily.

For example, in certain embodiments of the present invention, health of an intersection may be calculated as follows: Health=(Average Volume/Maximum Volume)*Volume Weight+(Average Speed/Maximum Speed)*Speed Weight+(Average Pacing/Maximum Pacing)*Pacing Weight. This is just an example of one way to calculate the health of an intersection. As discussed above, different variables and weights may be used to tailor the calculation as needed.

In addition, the traffic variables may also be assigned threshold values. For example, if the system is using the maximum pacing of an intersection to calculate the health of the intersection, and the throughput has not reached a predetermined threshold, then the health of the intersection may not be downgraded, even when pacing is not ideal. Similar singular thresholds may be used, e.g., in determining when to send safety alerts, although safety alerts may also be sent based on the overall calculation as well.

According to an embodiment of the present invention, the determination of traffic speed and volume through an intersection may also contain directional information so that the impact on other intersections in the network of roadways can be measured. The directional dependence of a typical intersection is illustrated in FIG. 1. Each of four detectors is responsible for monitoring traffic approaching the intersection from four different directions. The number of detectors required will vary depending on the number of streets entering the intersection.

Figure 2:
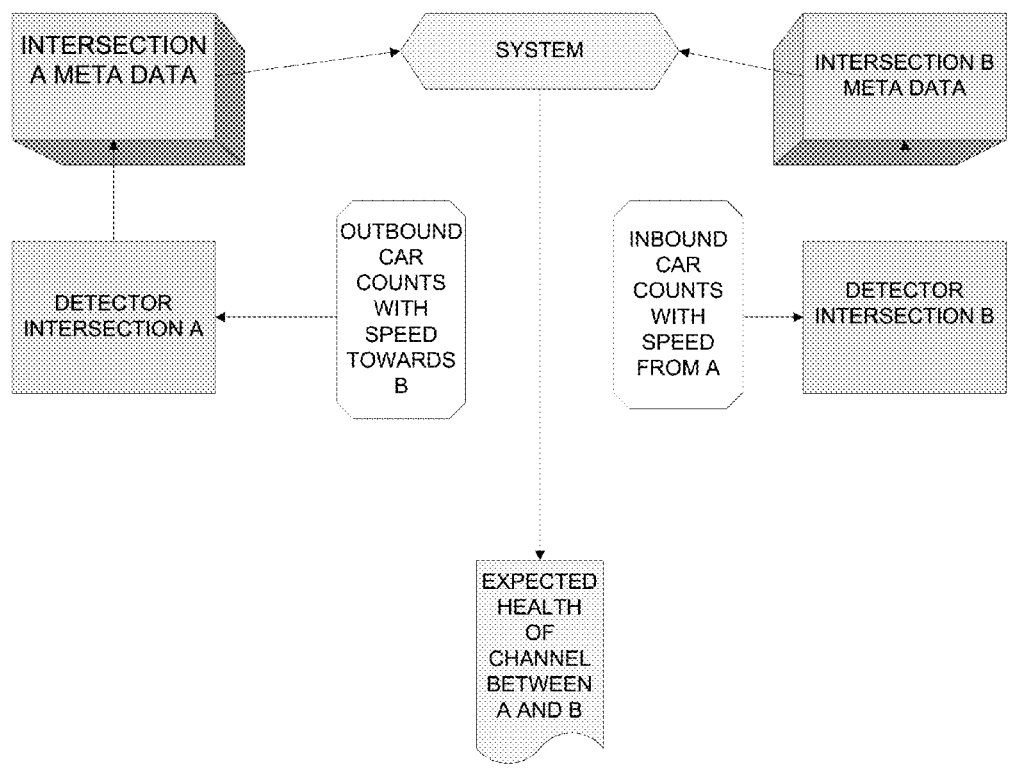
FIG. 2 depicts a flowchart of a method for determining travel time between two intersections according to an embodiment of the present invention.
Figure 3:
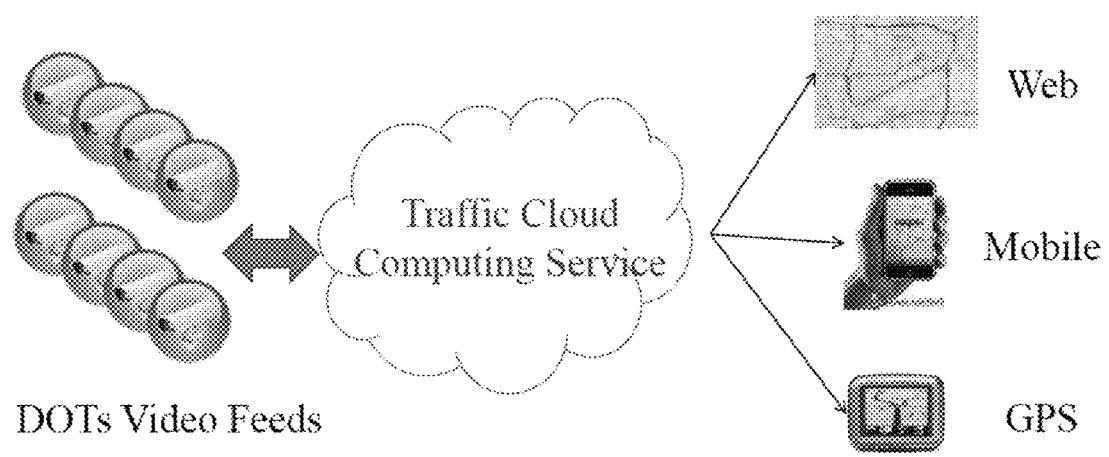
FIG. 3 depicts a flow chart of a method of transmitting intersection health information to receiving units according to an embodiment of the invention.

As indicated above, the four-way intersection illustrated in FIG. 1 has the potential to affect four other intersections. Therefore, the system of the present invention may also be used to determine the impact the health of one intersection has on the health of another intersection. Referring now to FIG. 2, data concerning the volume and speed of traffic leaving intersection A and traveling toward intersection B (and vice versa) may be measured using detectors at each intersection. For example, the traffic volume, lane-level data and average speeds of motor vehicles entering each leg of intersection A may be used to calculate the throughput of intersection A. The throughput of motor vehicles leaving intersection A and heading towards and arriving at intersection B can then be used to calculate the health of the road segment between intersections A and B. For example, if the detectors measure an increased volume of vehicles in a dedicated left turning lane of an initial intersection, this information can then be used to determine the impact this may have on an intersection located, e.g., to the left of the initial intersection. This information can also be used, e.g., to determine the impact a traffic accident near one intersection will have on the flow of traffic at another intersection.

This information can then be combined with various meta data for intersections A and B that includes, without limitation, the geolocation of each intersection and the cross streets through each intersection. This information (i.e., directional intersection throughput, intersection geolocation and cross streets) can then be used to establish traffic pattern relationships of one intersection to other intersections (or nodes) within a given circuit. The information gained from each intersection within a circuit can then be transmitted to other devices such as global positioning systems for purposes of planning routes that avoid problem intersections. For example, if there is a back-up of vehicles in a dedicated turning lane which turns onto road X, an alternate route may be suggested to get to road X which avoids the backed-up lane.

The information may also be used directly for city planning. For example, if the historical data collected evidences a consistent back-up of vehicles in the dedicated turning lane which turns onto road X, then the city may decide there is a need to, e.g., increase the length of the turning lane, add an advanced green arrow, etc.

In addition, the information may also be used to aid in direct response to incidents at a single location. For example, as the system described herein measures data in real-time, if there is an unusual volume of vehicles, or even a detection of vehicles on the shoulder of a lane at any given time, a response can be issued for the particular location (e.g., dispatch of emergency vehicles, changing traffic signals), as well as a preemptive response (e.g., re-routing traffic) with respect to other intersections in order to avoid the incident.

Once the health information of an intersection has been calculated, such information may then be transmitted to a receiving unit, such as the internet (including through any cloud-based software video analytics module using a network) or a remote device such as a cellular phone, a computer (desktop, laptop, etc.), a tablet or a global positioning system.

According to an embodiment of the present invention, a computer with proper access, granted via an online subscription, will query the distribution module and make requests for traffic information. For example, a device querying the distribution module may request intersection-specific information based on where a particular intersection is located (e.g., country, region, state, metro area, county, named routes and streets, cities, and neighborhoods). Once an intersection along a particular route has been established, the distribution module may return information concerning that intersection. Such information may comprise granular data about the intersection (e.g., direction, average throughput for hour and day, and other historical information) or a status score which may be, e.g., a number between 1 and 10 for the entire intersection. If, for example, a 10 is returned, the intersection is performing at peak efficiency and should be considered open for route planning. If, for example, a number less than 10 is returned, the requesting device can calculate alternate routes to avoid poorly performing intersections. It should be noted that this information can be granulated down to the lane level for the intersection. Thus, while the overall health of an intersection may be calculated, calculations can also provide detail for each lane within the intersection as well. This may be used, e.g., to determine expected delays for individual lanes (e.g., dedicated turning lanes), etc.

Another embodiment of the present invention uses the system described herein to provide intersection planning data. Intersection planning data may be used to determine the need for, e.g., a traffic light, traffic sign, road widening, additional lanes, additional roadways, suitability for nearby facilities, such as schools, parks, convention centers, etc. For example, if the health of the intersection is calculated and falls below a certain predetermined level of health, then, based on that calculation, the city may decide they need to install a traffic light to replace an existing stop sign. If the health of the intersection is calculated and lands above a certain predetermined level of health, then, based on that calculation, e.g., the city may decide it would be an appropriate place for a convention center.

Another embodiment of the present invention uses the system described herein to provide information relating to land value. For example, if the system detects a high volume of motor vehicles going through an intersection at any given time, this information may be used to determine that the land surrounding the particular intersection may have an increased value as commercial property, as compared to land surrounding an intersection which receives a lower volume of motor vehicles.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed:
1. A system comprising:
a detector configured to obtain traffic data relating to a first intersection;
a storage device communicatively connected to the detector, the storage device to store the traffic data obtained from the detector; and
a processor communicatively connected to the detector the processor to execute computerized instructions to:
calculate health information associated with the first intersection using the traffic data;
determine a receiving unit is associated with a subscription; and
distribute the health information to the receiving unit based on the subscription.

2. The system of claim 1, wherein the detector comprises at least one of an inductive loop, a video image processor, a microwave sensor, an infrared sensor, a magnetic sensor, a radio frequency tag, an ultrasonic sensor or a global positioning system.

3. The system of claim 1, wherein the traffic data comprises at least one of traffic volume, traffic speed, traffic location, time of day, traffic direction, or location of the first intersection.

4. The system of claim 3, wherein the location of the first intersection comprises data related to the location selected from the group consisting of country, region, state, metro area, county, neighborhoods, cities, streets, latitude/longitude and any combination thereof.

5. The system of claim 1, wherein the processor transmits an alert based on the health information of the first intersection to the receiving unit.

6. The system of claim 1, wherein the receiving unit is a remote device.

7. The system of claim 6, wherein the remote device is a cellular phone, a desktop computer, a laptop computer, a tablet, or a global positioning system.

8. The system of claim 1, wherein the traffic data used for calculating the health information of the first intersection is real-time traffic data.

9. The system of claim 1, the processor to forecast the impact to health information of a second intersection using the traffic data obtained from the first intersection.

10. A method comprising:
receiving, by a processor, traffic data relating to a first intersection from a detector;
storing the traffic data in a storage unit;
calculating, by the processor, health information of the first intersection using the traffic data;
determining, by the processor, a receiving unit is associated with a subscription; and
distributing the health information to the receiving unit based on the subscription.

11. The method claim 10, wherein the detector comprises at least one of an inductive loop, a video image processor, a microwave sensor, an infrared sensor, a magnetic sensor, a radio frequency tag, an ultrasonic sensor or a global positioning system.

12. The method of claim 10, wherein the traffic data comprises at least one of traffic volume, traffic speed, traffic location, time of day, traffic direction, or location of the first intersection.

13. The method of claim 12, wherein the location of the first intersection comprises data related to the location selected from the group consisting of country, region, state, metro area, county, neighborhoods, cities, streets, latitude/longitude and any combination thereof.

14. The method claim 10, further comprising transmitting an alert based on the health information of the first intersection to the receiving unit.

15. The method of claim 10, wherein the receiving unit is a remote device.

16. The method of claim 15, wherein the remote device comprises at least one of a cellular phone, a desktop computer, a laptop computer, a tablet, or a global positioning system.

17. The method of claim 10, wherein the traffic data used for calculating the health information of the first intersection is real-time traffic data.

18. The method of claim 10, further comprising forecasting the impact to health information of a second intersection using the traffic data obtained from the first intersection.

19. A method comprising:
receiving, by a processor, traffic data relating to an intersection from a detector;
storing the traffic data in a storage unit;
calculating, by the processor, health information of the intersection using the traffic data;
determining one or more route options for a vehicle based on the calculated health of the intersection;
determining a receiving unit is associated with a subscription; and
and
transmitting the one or more route options to the receiving unit based on the subscription.

20. The method claim 19, wherein the detector comprises at least one of an inductive loop, a video image processor, a microwave sensor, an infrared sensor, a magnetic sensor, a radio frequency tag, an ultrasonic sensor or a global positioning system.

21. The method of claim 19, wherein the traffic data comprises at least one of traffic volume, traffic speed, traffic location, time of day, traffic direction, or location of the intersection.

22. The method of claim 21, wherein the location of the intersection comprises data related to the location selected from the group consisting of country, region, state, metro area, county, neighborhoods, cities, streets, latitude/longitude and any combination thereof.

23. The method of claim 19, wherein the receiving unit is a remote device.

24. The method of claim 23, wherein the remote device comprises at least one of a cellular phone, a desktop computer, a laptop computer, a tablet, or a global positioning system.

25. The method of claim 19, wherein the traffic data used for calculating the health information of the intersection is real-time traffic data.

26. A method comprising:
receiving, by a processor, traffic data relating to an intersection from a detector;
storing the traffic data in a storage unit;
calculating, by the processor, health information of the intersection using the traffic data;
determining the health information of the intersection meets or exceeds a pre-determined safety alert level;
determining a receiving unit is associated with a subscription; and,
transmitting a safety alert to the receiving unit based on the subscription.

27. The method claim 26, wherein the detector comprises at least one of an inductive loop, a video image processor, a microwave sensor, an infrared sensor, a magnetic sensor, a radio frequency tag, an ultrasonic sensor or a global positioning system.

28. The method of claim 26, wherein the traffic data comprises at least one of traffic volume, traffic speed, traffic location, time of day, traffic direction, or location of the intersection.

29. The method of claim 28, wherein the location of the intersection comprises data related to the location selected from the group consisting of country, region, state, metro area, county, neighborhoods, cities, streets, latitude/longitude and any combination thereof.

30. The method of claim 26, wherein the receiving unit is a remote device.

31. The method of claim 30, wherein the remote device comprises at least one of a cellular phone, a desktop computer, a laptop computer, a tablet, or a global positioning system.

32. The method of claim 26, wherein the traffic data used for calculating the health information of the intersection is real-time traffic data.

33. A method comprising:
receiving, by a processor, traffic data relating to an intersection from a detector;
storing the traffic data in a storage unit;
calculating, by the processor, health information of the intersection using the traffic data;
determining an area of land proximal to the intersection is associated with a subscription; and
analyzing the health information of the intersection to determine a value of the area of land proximal to the intersection.

* * * * *

UNITED STATES PATENT AND TRADEMARK OFFICE
CERTIFICATE OF CORRECTION

PATENT NO. : 9,230,432 B2
APPLICATION NO. : 14/241697
DATED : January 5, 2016
INVENTOR(S) : Steve Donovan et al.

It is certified that error appears in the above-identified patent and that said Letters Patent is hereby corrected as shown below:

Title Page (item 73) Assignee: change "Alpharella" to "Alpharetta".

Signed and Sealed this
Twenty-eighth Day of June, 2016

Michelle K. Lee
*Director of the United States Patent and Trademark Office*